Patented June 10, 1930

1,762,871

UNITED STATES PATENT OFFICE

ARTHUR R. LYTLE, OF ELMHURST, NEW YORK, ASSIGNOR TO UNION CARBIDE & CARBON RESEARCH LABORATORIES, INC., A CORPORATION OF NEW YORK

WELDING ALLOY

No Drawing.　　Application filed December 20, 1929.　Serial No. 241,453.

My invention relates to fusion welding alloys, and particularly to copper alloys for the welding or brazing of ferrous material parts.

It has been found convenient in the art of autogenous welding to utilize copper alloys, such as the bronzes or brasses for the purpose of joining parts formed of ferrous materials. This has been a convenient welding method because of the good strength, and ductility of the alloys as deposited, and the relatively low temperature of application of the welding material, as well as the ease and convenience with which it may be applied. For the formation of a permanent weld, such alloys as the copper-zinc brasses or bronzes have been found quite satisfactory. However, when the weld must be remade a number of times, as where it is desirable to separate the parts, after welding, and then re-weld, or particularly where it is desired to build up repeatedly worn surfaces with a bearing bronze, the bronzes or brass alloys previously used have not been found entirely satisfactory, because of the fact that they penetrate the ferrous base metal for a considerable distance. This penetration appears to take place between the crystals, to form an inter-crystalline matrix, and appears to be a typical inter-metallic corrosion such as occurs in a number of alloys when in contact with other metals in the molten state. The molten copper alloy appears to enter the steel and spread along the grain boundaries to a considerable depth. Pure copper and many of its alloys show this phenomenon, and the presence of tin appears to accelerate the rate of penetration. It results in a destruction and cracking of the surface layer of the ferrous part, producing a serious reduction in strength, which may lead to failure in service of the iron structure.

The process of welding with bronze is particularly applicable to the building up of surfaces which are subject to wear, such as bearings, where the bronze is highly advantageous as a wear resisting material, and in which repeated replacement after wear may be made by fusion welding of the bronze material. Such a process would be particularly advantageous except for the fact noted, that the repeated fusion welding tends to produce the above described penetration and injury to the surface of the iron frame, resulting in the possibility of failure, particularly on such parts as locomotive connecting rods.

My invention provides an alloy, which is adapted to use for the above described purposes, which is of high strength, high ductility, adapted to application at relatively low temperature, and of good wear resisting properties, and which may be conveniently applied by fusion welding to ferrous material parts, without the occurrence of penetration or injury to the surface or strength of the ferrous material part.

Other objects and details of my invention will be apparent from the following description.

I find that an alloy composed of copper, nickel, and zinc in appropriate proportions has the desired properties. The nickel may suitably comprise at least 25% of the alloy, and the zinc not more than 20%, with the balance mainly copper. Such an alloy is well adapted to fusion welding.

If the alloy is to be repeatedly applied by fusion to the same ferrous surface, it is further desirable that the nickel be increased to at least 30%, in order to avoid undesirable penetration and injury to the surface of the ferrous part. To further increase the ease of welding, small quantities of silicon may also be added to the welding alloy.

A desirable alloy for the purpose abovementioned may be produced by the following list of materials added, within the indicated range of composition.

Nickel _____ 15 to 60%
Zinc _____ up to 25%
Silicon _____ up to 4%
Manganese _____ up to 4.00%
Iron _____ up to 4.00%
Copper _____ Balance.

The nickel of the alloy when in the molten state appears to absorb gases from the surrounding atmosphere readily, and then at the instant of solidification to throw them out of solution to form bubbles in the metal, weakening its structure. An alloy containing mainly copper, zinc and nickel is usable for welding purposes, but requires great care and skill in the conduct of the welding operation, to avoid the production of a weld full of blowholes and porosity, and accordingly weak and unsatisfactory. I find, however, that the addition of a very small quantity of silicon, even as small an amount as 0.05% exerts a profound effect upon the characteristics of the alloy when in the molten state, and during the transition from the molten to the solid state. The exact mechanism of the effect is not apparent, but I find that the use of the silicon removes the tendency of the metal to dissolve gases, and eject them at the instant of solidification.

While I have shown but a limited number of embodiments of my invention it is adapted to other modifications therefrom without departure from the spirit thereof and it is desired therefore that only such limitations shall be imposed upon the appended claims as are indicated therein, or required by the prior art.

I claim as my invention:

1. A composite article comprising a ferrous portion and a body of readily fusible copper-zinc-nickel alloy firmly welded thereto, said alloy containing 25% to 60% of nickel; not more than 25% of zinc; and 0.05% to 4% of silicon; with the remainder principally copper.

2. A composite article comprising a ferrous portion and a body of readily fusible copper-zinc-nickel alloy firmly welded thereto, said alloy containing about 30% of nickel, about 20% of zinc, and about 0.05% of silicon, with the remainder principally copper.

In testimony whereof, I affix my signature.

ARTHUR R. LYTLE.